March 18, 1969  AKIRA MIZUNO  3,433,336
THROTTLE OPERATED BRAKE HOLDER
Filed Jan. 26, 1967
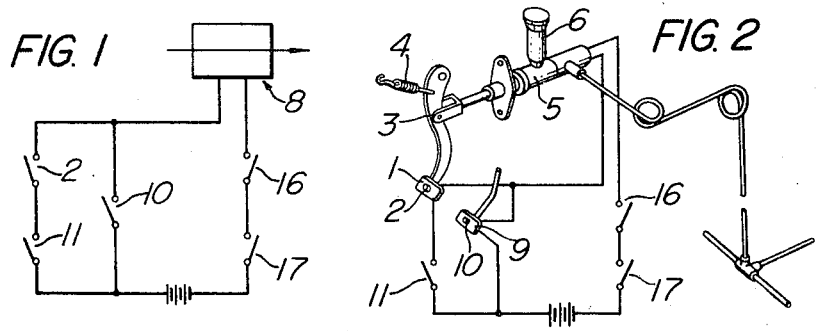
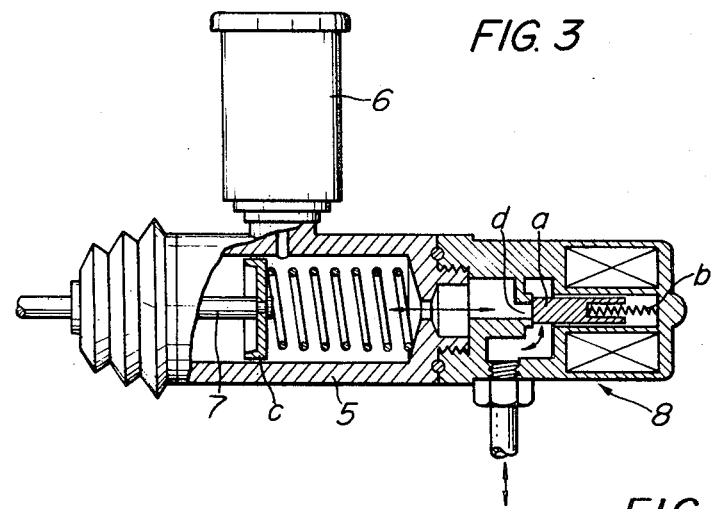
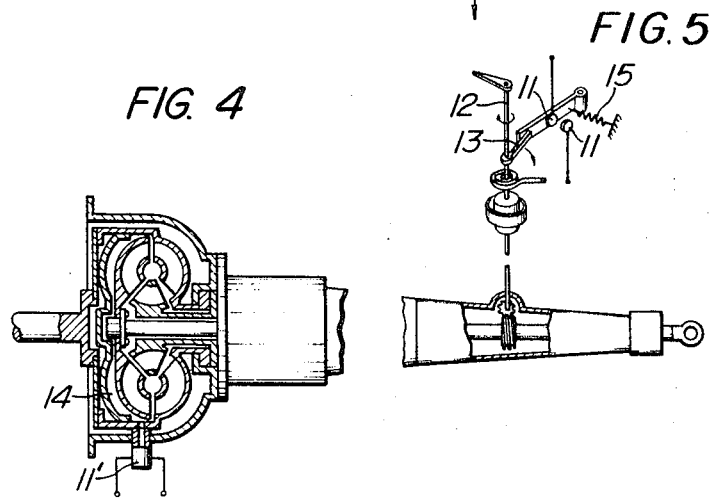
INVENTOR
AKIRA MIZUNO
BY  *Paul M. Craig, Jr.*
ATTORNEY 3,433,336
THROTTLE OPERATED BRAKE HOLDER
Akira Mizuno, 60 Shinmeicho, 7-chome,
Kariya-shi, Japan
Filed Jan. 26, 1967, Ser. No. 612,022
Claims priority, application Japan, Mar. 11, 1966,
41/15,189
U.S. Cl. 192—3                                6 Claims
Int. Cl. F16d 67/00, 23/00; B60t 11/10

ABSTRACT OF THE DISCLOSURE

A braking system for vehicle which is capable of automatically locking the wheels of a vehicle in a braked condition when the vehicle has been brought to rest but will not lock the wheel in the braked condition when it is actuated to reduce the speed of the vehicle during traveling, and which comprises an electromagnetic valve, a switch, a detecting switch, and a concealed switch.

---

The present invention relates to a braking system for vehicles such as automobiles and more particularly to such a braking system which is capable of automatically locking the wheels of a vehicle in a braked condition when the vehicle has been brought to rest but will not lock the wheels in the braked condition when it is actuated to reduce the speed of the vehicle during traveling.

Automobiles or the like provided with conventional braking system and particularly with a nonclutch automatic reduction gear have the drawback that a brake pedal must be continuously stepped on throughout a period during which the automobile is temporarily held stationary at an intersection or others, because otherwise the vehicle would tend to move forward, though very slowly, when the engine is idling at an excessively high r.p.m. Therefore, a braking system is desired which, when once actuated by stepping on the brake pedal to bring the automobile to halt, will lock the wheels in a braked condition until a step is taken for restarting the automobile, even after the foot is removed from said brake pedal. Such a braking system, on the other hand, is not satisfactory for braking the wheels temporarily closed electromagnetic valve provided in a circuit of mobile quickly without bringing the automobile to halt, because, with such braking system, the wheels are locked in a braked condition at every time it is actuated.

It is, therefore, the object of the present invention to provide a braking system which is free from the aforementioned drawback of the conventional braking system and which is capable of locking the wheels of a vehicle in a braked condition automatically when the vehicle has been stopped but will not lock the wheels in the braked condition when actuated to reduce the speed of the vhicle temporarily during traveling.

The inventive braking system comprises a normally closed electromagentic valve provided in a circuit of braking fluid, a switch adapted to be closed in association with the braking operation, a detecting switch adapted to be maintained in a closed position during traveling of a vehicle, said switches being provided in an electric circuit for actuating said electromagnetic valve in series, and a concealed switch adapted to be closed in association with the actuation of an accelerator pedal and provided in said electric circuit in parallel with respect to said first two switches.

In order that the present invention may be more clearly understood, reference may be had to the accompanying drawings in which the present invention is illustrated as applied to an automobile and in which:

FIGURE 1 is a circuit diagram for a magnet in the electromagnetic valve;

FIGURE 2 is a diagrammatic perspective view of the braking system according to the present invention;

FIGURE 3 is a vertical cross section of the electromagnetic valve which is connected directly to a brake master cylinder; and FIGURE 4 is a set of a side view, with portions broken away, and a diagrammatic perspective view, illlustrating the operating mechanism for an automatic switch.

FIGURE 5 is a side view, with portions broken away, illustrating a modified operating mechanism for an automatic switch.

Referring to the drawings, a brake pedal 1 is provided thereon with a foot switch 2 and is mounted for pivotal movement about a fulcrum pin 3. The brake pedal 1 is biased by a tension spring 4 so as to be held normally in a nonoperative position, that is, to rotate about the fulcrum pin clockwise as viewed in FIG. 2. Reference numeral 5 indicates a brake master cylinder, 6 an oil tank for a brake oil and 7 a piston rod which has one end fixed to a piston c of the master cylinder and has the other end operatively connected to the brake pedal 1. Reference numeral 8 indicates an electromagnetic valve which, in the figures, is shown as being connected directly to the master cylinder 5 but may be provided intermediate a brake oil circuit leading from the master cylinder 5 to the front and rear wheels of an automobile. In the electromagnetic valve 8, a valve element a is pressed against a valve seat by the bias of a spring b, with its end surface facing directly towards the input side of the master cylinder. Thus, it will be understood that, when the piston c is pushed rearwardly, the valve element a is moved rearwardly by the hydraulic pressure acting directly on the end surface thereof, against the bias of the spring b, to open a valve port d. In other words, when the brake pedal 1 is stepped on, the valve port d is opened automatically only by means of the oil pressure in the master cylinder, even without requiring excitation of the electromagnetic value, thereby applying a braking force to the wheels. Upon removing the stepping force from the brake pedal the valve element a is automatically moved forward to close the valve port d by the bias of the spring b as well as by virtue of a negative pressure developed on the input side of the valve port, so that the reverse flow of the brake oil is prevented and the braking force of the brake oil is maintained. The wheels are, therefore, successively locked in the braked condition even after the foot is moved away from the brake pedal.

An accelerator pedal 9 has a foot switch 10 provided therein which is connected to the aforementioned foot switch 2 in parallel. There is also provided an automatic switch 11 or 11' which is adapted to be actuated by an element, such as a needle driving spindle 12 of speedometer as shown in FIGURE 5 or hydraulic pressure 14 in an automatic transmission, as shown in FIG. 5, which is in motion during traveling of the automobile. More specifically, the arrangement is such that the spindle 12 of speedometer carries a stopper 13, which, in a stationary state, keeps a movable contact away from a fixed contact against the bias of a spring 15 but, when the spindle is set in motion, it permits said movable contact to be in pressure contact with the fixed contact under the bias of said spring. Where hydraulic pressure is utilized instead of a speedometer needle drive for the actuation of the automatic switch, a hydraulically operable switch 11' is used as shown in FIGURE 4. Switch 11' is opened by fluid pressure in the transmission. Reference numerals 16 and 17 respectively indicate a key switch and a concealed switch.

The switch 11 or 11', which is normally held in an open position, is closed only after the automobile has started travelling and is maintained in the closed position throughout the period of travelling of the automobile. The valve port $d$, therefore, is closed by the valve element $a$ when the automobile is held stationary, thereby locking the wheels in a braked condition. Such a braked condition is maintained even when the key switch 16 and the concealed switch 17 are made open, but is released when the foot switch 10 is actuated. In order to ensure safety of the automobile during parking, therefore, it is recommendable to keep the concealed switch 17 open after the automobile has been brought to rest for parking.

In explaining the operation of the inventive braking system, when the brake pedal 1 is stepped on for the purpose of stopping the automobile, the foot switch 2 is closed simultaneously. In this case, since the switch 11 has previously been closed during travelling, the valve element $a$ is excited to open the valve port $d$ and thereby the wheels are braked by the hydraulic pressure. When the automobile is brought to halt, the switch 11 or 11' is opened automatically interrupting the electric circuit, whereupon the valve port $d$ is closed by the valve element $a$ and thus the wheels are retained in the braked condition continuously even after the stepping force is removed from the brake pedal.

However, when the brake is actuated to quickly reduce the speed of the automobile during travelling but not for stopping the automobile, the valve element $a$ is retained in an open position during the operation of the brake pedal since the switch 11 or 11' is closed and, therefore, the wheels will not be locked in a braked condition. This means that the braking system can be operated in the same manner as those which are not provided with an electromagnetic valve.

For starting the automobile from the stationary state, the accelerator pedal 9 is stepped on as in the ordinary automobile, whereupon the switch 10 on the accelerator pedal 9 is closed and the valve element $a$ is brought into the open position. Therefore, the wheels are released from the braked condition in which they have been locked during parking, providing for normal operation of the automobile.

Due to such arrangement as described above, the inventive braking system is capable of braking the wheels with no trouble during travelling of the automobile because it will not lock the wheels in the braked condition during this period, while, when the automobile is temporarily held in a stationary state, it eliminates the necessity for continuously stepping on the brake pedal because the wheels are automatically locked in a braked condition as described hereinabove. In addition, by placing the concealed switch in an off position during parking, it is possible to lock the wheels in the braked condition even when the accelerator pedal is stepped on, so that it is possible to effectively protect the automobile from burglary. Furthermore, the inventive braking system also enables the automobile to be started quickly with no trouble since the braked condition can be released upon stepping on the accelerator pedal. In this case, the concealed switch should have of course been placed in a closed position previously. As will be seen from the foregoing description, the inventive braking system is highly effective for efficient operation of vehicles.

I claim:

1. A braking system for motor vehicles having power transmission means, a brake pedal and an accelerator, comprising a braking fluid circuit, a normally-closed electromagnetic valve within said fluid circuit, an electric circuit for actuating said electromagnetic valve including said valve and a voltage source, said electric circuit further including first switch means closed by depression of said brake pedal and open when said brake pedal is released, second switch means, connected in series with said first switch means, said second switch means being actuated by means for sensing motion of the vehicle such that said second switch means is closed while the vehicle is in motion and open while the vehicle is at rest, and third switch means connected in parallel with said first switch means and said second switch means, said third switch means being closed by depression of said accelerator and open when said accelerator is released.

2. A braking system according to claim 1, wherein said means for sensing motion of the vehicle and actuating said second switch means in response thereto includes a speedometer spindle geared to the vehicle driveshaft and a contact operatively connected with said spindle and positioned so as to engage with an associated contact when said driveshaft is rotating, such engagement being prevented when said driveshaft is at rest.

3. A braking system according to claim 1, wherein said means for sensing motion of the vehicle and actuating said second switch means in response thereto includes a hydraulic pressure-actuated means.

4. A braking system according to claim 1, wherein said electric circuit further includes fourth switch means connected between said voltage source and said electromagnetic valve, said fourth switch means being selectively opened or closed by the actuation of a control means positioned within the driver's compartment of the vehicle in a location normally concealed from the view of the occupants of the vehicle.

5. A braking system according to claim 1, wherein said electric circuit further includes fifth switch means, connected between said voltage source and said electromagnetic valve, said fifth switch means being closed by the activation of the ignition circuit of the motor vehicle and opened by the deactivation thereof.

6. A braking system according to claim 4, wherein said electric circuit further includes fifth switch means, connected in series with said fourth switch means, said fifth switch means being closed by the activation of the ignition circuit of the motor vehicle and opened by the deactivation thereof.

References Cited

UNITED STATES PATENTS

| 1,724,568 | 8/1929 | Durning et al. |
| 2,235,412 | 3/1941 | Weiss et al. |
| 2,577,680 | 12/1951 | Harmon et al. |
| 2,630,195 | 3/1953 | Weiss et al. |
| 2,690,824 | 10/1954 | Forman. |
| 2,799,372 | 7/1957 | Thomas. |

BENJAMIN W. WYCHE III, *Primary Examiner.*